United States Patent
Doany (10) Patent No.: US 10,495,772 B2
(45) Date of Patent: Dec. 3, 2019

(54) MAGNETO-MECHANICAL MARKER WITH ENHANCED FREQUENCY STABILITY AND SIGNAL STRENGTH

(71) Applicant: 3M INNOVATIVE PROPERTIES COMPANY, St. Paul, MN (US)

(72) Inventor: Ziyad H. Doany, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 55 days.

(21) Appl. No.: 15/571,732

(22) PCT Filed: May 4, 2016

(86) PCT No.: PCT/US2016/030756
§ 371 (c)(1),
(2) Date: Nov. 3, 2017

(87) PCT Pub. No.: WO2016/182815
PCT Pub. Date: Nov. 17, 2016

(65) Prior Publication Data
US 2018/0156935 A1    Jun. 7, 2018

Related U.S. Application Data

(60) Provisional application No. 62/160,092, filed on May 12, 2015.

(51) Int. Cl.
*G01V 3/08*  (2006.01)
*G01K 7/36*  (2006.01)
(Continued)

(52) U.S. Cl.
CPC ............... *G01V 3/081* (2013.01); *G01K 3/04* (2013.01); *G01K 7/36* (2013.01); *G01V 3/165* (2013.01); *G01V 15/00* (2013.01)

(58) Field of Classification Search
CPC ............ G08B 13/2408; G08B 13/2422; G08B 13/2442; G01K 7/36
See application file for complete search history.

(56) References Cited

U.S. PATENT DOCUMENTS 5,786,762 A *  7/1998  Liu ................. G01R 33/18
                                        148/108
6,359,563 B1 *  3/2002  Herzer ............. G08B 13/2408
                                        148/108
(Continued)

FOREIGN PATENT DOCUMENTS

CN    201188254 U    1/2009
CN    201364633 U    12/2009
(Continued)

OTHER PUBLICATIONS

International search report for PCT International Application No. PCT/US2016/030756 dated Aug. 12, 2016, 3Pages.
(Continued)

*Primary Examiner* — Dean O Takaoka
*Assistant Examiner* — Alan Wong
(74) *Attorney, Agent, or Firm* — Gregg H. Rosenblatt (57) ABSTRACT

A magneto mechanical resonator device comprises a plurality of ferromagnetic elements disposed in a stacked arrangement, each ferromagnetic element having a first lengthwise end and a second lengthwise end. A first bias magnetic element is disposed adjacent to the first lengthwise end of the stacked arrangement and a second bias magnetic element is disposed adjacent to the second lengthwise ends of the stacked arrangement. A clamping element is disposed in a central lengthwise region of the stacked arrangement to restrict the vertical displacement of the plurality of ferro- (Continued)

magnetic elements with respect to each other at the central lengthwise region, wherein the first and second ends experience flaring movement.

19 Claims, 9 Drawing Sheets

(51) Int. Cl.
*G01K 3/04* (2006.01)
*G01V 3/165* (2006.01)
*G01V 15/00* (2006.01)

(56) References Cited

U.S. PATENT DOCUMENTS

| | | |
|---|---|---|
| 6,407,676 B1 | 6/2002 | Tanji et al. |
| 6,426,700 B1 | 7/2002 | Lian |
| 6,720,877 B2 * | 4/2004 | Lian ............... G01V 15/00 340/572.6 |
| 7,075,440 B2 | 7/2006 | Fabian |
| 7,779,533 B2 * | 8/2010 | Peter ............ G08B 13/2408 148/311 |
| 8,125,338 B2 * | 2/2012 | Li ............... G08B 13/2408 148/108 |
| 8,274,388 B2 * | 9/2012 | Li ............... G08B 13/2434 340/572.1 |
| 2002/0140558 A1 | 10/2002 | Lian |
| 2004/0207528 A1 | 10/2004 | Fabian |
| 2012/0068823 A1 | 3/2012 | Doany |
| 2012/0325359 A1 | 12/2012 | Doany |
| 2013/0001314 A1 | 1/2013 | Hasegawa |
| 2013/0099790 A1 | 4/2013 | Doany |

FOREIGN PATENT DOCUMENTS

| | | |
|---|---|---|
| CN | 201364634 U | 12/2009 |
| EP | 0916953 | 5/1999 |
| WO | WO 2013/010314 | 1/2013 |

OTHER PUBLICATIONS

Kaniusas, E., et al., "Magnetostrictive amorphous bilayers and trilayers for thermal sensors", Journal of Magnetism and Magnetic Mater; Elsevier (Jan. 1, 2003); vol. 254-255, pp. 624-626.

Supplemental EP Search Report for EP Appl. No. 16793204.5, dated Apr. 19, 2019, 5 pp.

Search Report for CN Appl. No. 201680027295.9, dated Jun. 27, 2019, 2 pp.

* cited by examiner

MAGNETO-MECHANICAL MARKER WITH ENHANCED FREQUENCY STABILITY AND SIGNAL STRENGTH

BACKGROUND

Magneto-mechanical resonators are well known and have been used in retail security applications for decades. In addition, magneto-mechanical resonators (MMRs) are also suitable for buried infrastructure due to their low cost, low profile and flexible components. They can be configured as stand-alone markers or physically attached to an underground pipe or utility. They can be used to identify a buried asset and its location accurately. For example, see US 2012/068823; US 2012/0325359; and US 2013/0099790, each of which is incorporated herein by reference in its entirety.

However, the detection range and frequency stability of such MMRs can be limited.

SUMMARY OF THE INVENTION

In a first aspect of the invention, a magneto mechanical resonator device comprises a plurality of ferromagnetic elements disposed in a stacked arrangement, each ferromagnetic element having a first lengthwise end and a second lengthwise end. A first bias magnetic element is disposed adjacent to the first lengthwise end of the stacked arrangement and a second bias magnetic element is disposed adjacent to the second lengthwise ends of the stacked arrangement. A clamping element is disposed in a central lengthwise region of the stacked arrangement to restrict displacement of the plurality of ferromagnetic elements with respect to each other at the central lengthwise region, wherein the first and second ends experience flaring movement.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The invention will be described hereinafter in part by reference to non-limiting examples thereof and with reference to the drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

A magneto mechanical resonator (MMR) marker with extended signal range for use in locating and identifying buried assets is described herein. Such a magneto-mechanical resonator can be suitable for buried infrastructure due to its low cost, low profile and flexible components. The MMR marker can be a stand-alone marker, it can be physically attached to an underground asset, such as a pipe or other utility, or it can be attached to another device or carrier, such as caution or warning tape, located at or near the underground asset. In particular, the MMR markers described herein can provide frequency tunability, high frequency stability, high energy storage, and a low profile, all in combination with extended detection range over conventional MMR markers.

Figure 1A:
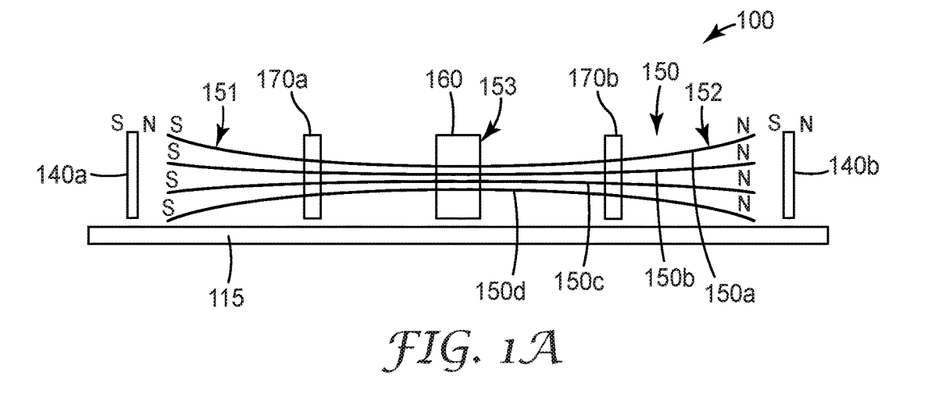
FIG. 1A is a partial side view of a magneto mechanical resonator device according to a first aspect of the invention.
Figure 1B:
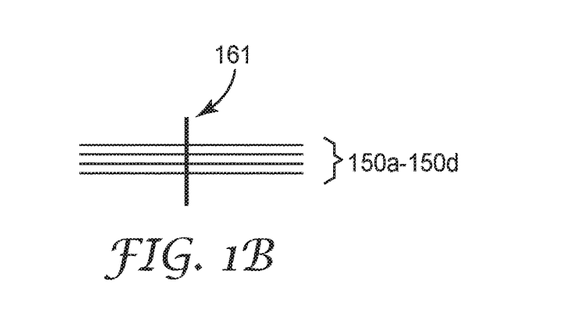
FIG. 1B is a partial side view of an alternative clamping element according to another aspect of the invention.
Figure 1C:
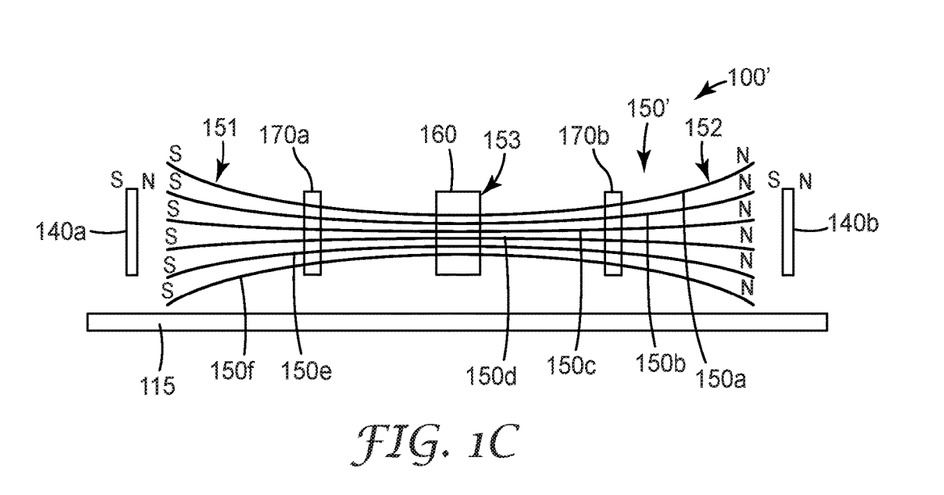
FIG. 1C is a partial side view of a magneto mechanical resonator device according to another aspect of the invention.

FIG. 1A shows a first aspect of the present invention, an MMR marker 100. MMR marker 100 includes a plurality of ferromagnetic elements 150 (also referred to herein as resonator strips or ribbons). In this embodiment, the ferromagnetic elements comprise four resonator strips 150a-150d disposed in a stacked arrangement, each ferromagnetic element having a first lengthwise end 151 and a second lengthwise end 152. While four resonator strips are shown as comprising ferromagnetic element stack 150, the plurality of ferromagnetic elements may comprise a stack of 2, 3, 4, 5, 6, 7, 8, or more resonator strips, depending on the conditions. For example, FIG. 1C shows an MMR marker 100' that includes a stack of six ferromagnetic elements (resonator strips 150a-150f).

Referring back to FIG. 1A, the resonator strips 150a-150d can be stacked directly on top of each other, or alternatively, one or more spacers, such as glue dots (not shown) can be disposed between resonator strips at the central lengthwise region 153 of the stack 150 such that the strips are not directly in contact with one another at region 153.

In this aspect, resonator strips 150a-150d each comprise a ferromagnetic material with magnetostrictive properties, such as a magnetic amorphous alloy or crystalline material such as Metglas 2826 MB, 2605SA1 or 2605S3A made by Metglas, Inc. of Conway, S.C. Resonator strips 150a-150d can also comprise a similar material, such as those available from Vacuumschmelze GmbH of Hanau, Germany. The physical dimensions, such as the length, width, and thickness, of the resonator strip(s) can be chosen based on the desired response frequency. The ribbons may be annealed or non-annealed. For strips/ribbons that have a curl along the long axis, the stack of resonant magnetic elements can include some ribbons oriented in a curl-up position, while the remaining ribbons are oriented in a curl-down orientation, thus helping to provide reduced potential frequency shifting when rotated along the long axis in the horizontal orientation. In some aspects, each of the ferromagnetic elements comprises a ferromagnetic metal strip having a length of about 25 mm to 40 mm. In another aspect, each of the ferromagnetic elements comprises a ferromagnetic metal strip having a length of about 40 mm to 65 mm.

In contrast to conventional MMR marker configurations, which typically provide bias magnets that are disposed underneath, above, or to the side of a resonator strip or strips, MMR marker 100 includes bias magnetic elements disposed at each end of the resonator element stack. As shown in FIG. 1A, a first bias magnetic element, such as bias magnet 140a is disposed adjacent to end 151 of the resonator element stack and a second bias magnetic element, such as bias magnet 140b is disposed adjacent to end 152 of the resonator element stack. The magnetic axes of the bias magnets 140a, 140b are set in the same general direction along the ribbon stack long axis. This magnetic element bias orientation can help reduce the effects of gravity on the ferromagnetic element stack (for example, if a bias magnet is placed above one or more ferromagnetic elements, gravity will act to pull the element(s) away from the bias magnet). With the end bias configuration described herein, even if the MMR marker is flipped upside down (a 180 degree rotation from the orientation shown in FIG. 1A), the signal from the resonator element stack 150 will not be significantly impacted.

For the embodiment shown in FIG. 1A, bias magnets 140a, 140b can be spaced at a distance of about 0.5 mm-10 mm, preferably about 7 mm-8 mm, from respective ends 151, 152 of the ribbon stack. In some aspects, in order to boost bias, the bias magnets can be placed closer to the ribbon stack ends, for example, at a distance of from about 0.5 mm to about 1 mm.

Bias magnetic elements 140a, 140b can each comprise a permanent magnet or a magnetically hard or semi-hard metal strip. A magnetically hard magnetic bias material that is not readily changeable can be utilized herein because its bias characteristics are unlikely to change when buried underground. The magnetic bias layer 170 can be made from any magnetic material that has sufficient magnetic remanence when magnetized to appropriately bias the resonators, and sufficient magnetic coercivity so as to not be magnetically altered in normal operating environments. A commercially available magnetic material such as Arnokrome™ III from The Arnold Engineering Company of Marengo, Ill., can be utilized, though other materials could serve equally well. For example, in one particular aspect, the dimensions of the bias magnets (Neodymium magnets available from K&J Magnetics Inc.) can be about 1/16" (thickness), 1/8" (height), and 1/4" (width) with magnetization through the thickness. Of course, bias magnet dimensions can vary based on resonator element size and width. As with linear or bar magnets, magnetic bias elements 140a, 140b can each have magnetic poles, one at each end, as indicated by the N and S designations shown in FIG. 1A.

In another aspect, MMR marker 100 can include field concentrators disposed between the bias magnetic elements and each end of the resonator element stack. The field concentrators help collect and direct the magnetic field from the bias magnetic elements towards the ends of the resonator element stack. This configuration can be less susceptible to position errors and allows for a greater distance/separation from the resonator element stack ends and can help provide straighter flux lines and less magnetic attraction force. In addition, using a field concentrator allows for the use of a smaller permanent magnet as a bias magnetic element, which helps reduce component cost.

Further, MMR marker 100 can include a clamping element 160 disposed in a central lengthwise region 153 of the resonator element stack 150. The clamping element 160 restricts the displacement of the ferromagnetic elements 150a-150d with respect to each other at the clamping element position. The clamping element 160 can comprise a rigid element or frame-like structure, such as shown in FIG. 1A. In a further aspect, the clamping element 160 can be formed from a magnetic material or a set of small magnets. Alternatively, as shown in FIG. 1B, the clamping element 160 can comprise a pin 161 that is inserted through each strip 150a-150d. Using a central pin 161 as a clamping element can also help prevent lateral displacement of one or more of the resonator elements towards one of the end bias magnets. If one or more of the individual resonator elements move slightly from the exact center position, the attraction force becomes stronger and will pull some of the individual resonator elements to one end over time, which can reduce Q and signal strength.

With the bias magnetic positioning shown in FIG. 1A, the ribbons/strips 150a-150d in the resonator stack 150 become magnetized while subjected to the bias magnetic field from each end. This configuration creates repulsion forces between all the ribbons/strips 150a-150d at each end causing the ribbon/strip ends to flare or fan out when the resonator stack is held together in the central region by clamping element 160, while at the same time, all the ribbon ends are subjected to an attraction force towards the magnetic bias elements along the long axis of the ribbon/strip. This creates a pull force along the long axis of the ribbons/strips and a cross repulsion force, causing an air suspension of all the ribbon ends at end regions 151, 152 with minimal to no surface contact between the ribbons/strips at end regions 151, 152 (surface contact is expected in the central region 153 when held by clamping element 160, except when using spacers between the ribbons/strips), regardless of the initial curl of the ribbons/strips 150a-150d.

In one aspect, the clamping element 160 is configured to suspend each ferromagnetic element from each other at the central lengthwise region 153. In another aspect, the clamping element 160 can include a shock absorbing feature to help reduce resonator element stack movement when the MMR is subjected to large vibrations during transport or installation. In a further alternative, a combination of glue dots or a mechanical clamp with a permanent magnet clamp set can provide short term robustness to shock, drop, etc. while having a permanent hold by the permanent magnets.

In this manner, when exposed to an external magnetic field at a particular frequency, the resonator strips couple to the external magnetic field and convert the magnetic energy into mechanical energy, in the form of magneto-mechanical oscillations of the resonator strips. As shown in FIG. 1A, as the central portion of the stacked arrangement 150 is restricted from displacement by clamping element 160 the first and second ends of each resonator element 150a-150d experience a flaring movement. As shown in FIG. 1A, under the bias magnetic field, first ends 151a-151d are flared away from one another at one end of the element stack and second ends 152a-152d are flared away from one another at the second end of the element stack.

In operation, MMR marker 100 resonates at its characteristic frequency when interrogated (using e.g., a portable locator) with an alternating magnetic field tuned to this frequency. Energy is stored in the marker during this interrogation period in the form of both magnetic and mechanical energy (manifested as resonator vibrations). When the interrogation field is removed, the resonator continues to vibrate and releases significant alternating magneto-mechanical energy at its resonant frequency that can be remotely sensed with a suitable detector, which can be incorporated within the same portable locator. Thus, MMR marker 100 can be located by exciting it with an external alternating magnetic field where energy is stored in the marker, and then detecting the magnetic field generated by the MMR marker as it dissipates its stored energy exponentially, at its own resonant frequency. Such a response alerts a locating technician to the presence of MMR marker 100.

The MMR antenna length (or aperture) and gain (or resonance quality) directly affects the maximum detection range, along with the locator transmitting power and receiver. The higher the received signal, the higher the detection range would be, as expected. However, as observed by the investigators, conventional MMR performance is highly sensitive to environmental conditions. Thus, if the resonant ribbons/strips are displaced due to gravity, several effects can be noticed. First, the resonance quality and gain may vary significantly due to change in friction and forces between the ribbons/strips themselves. Second, the resonance frequency may shift due to the ribbon to bias magnet separation distance (for conventional MMR designs) changing as well as internal stress forces changing due to flexing. If the frequency shift becomes large due to such environmental effects, the MMR return signal will be attenuated by the locator receiver noise filter, which will cause a reduction in detection distance. If the locator receiver bandwidth is increased to accommodate a large MMR marker resonant frequency shift, the noise floor will also increase and can cause a reduced signal-to-noise ratio (SNR), which reduces the detection distance. Other conventional methods incorporating a narrow bandwidth frequency sweep in the locator to cover the MMR frequency shift will have a higher effective bandwidth and suffer a reduced SNR as well.

Another consideration with locator systems is that system response time has a limit related to worker efficiency, which limits the minimum bandwidth in the locator receiver. When a technician uses a handheld locator for locating buried markers, it is advantageous to have a fast response for work efficiency.

A further consideration is that the maximum transmitter output power may be limited by radio authorities, as well as battery weight and size.

Therefore, a high gain MMR marker that is stable in frequency and gain over environmental conditions is advantageous for maximizing the worst case detection distance of a buried marker or cluster of markers, irrespective of locator output power.

When multiple MMR markers are used to amplify the response, higher gain is achieved by highly stable markers as well as MMR configurations that vary in a predictable manner where all the MMRs in a cluster would shift substantially the same amount and continue to add as a function of the number of markers in a cluster, instead of, in a worse case, subtracting from each other due to phase reversal.

For sensing applications, it is advantageous to have a design such as provided in the described embodiments herein in order to have a higher stability and predictability, and therefore a higher sensitivity marker.

There are several specific performance related characteristics, such as frequency, signal and Q that can be optimized with an MMR marker locator system, with each having its own advantages depending upon the specific application and detection criteria. In many applications, the orientation and rotation of an MMR marker cannot be controlled. The earth's magnetic field adds to the ribbon bias field as a vector, increasing or reducing it by up to +/−0.6 Oe. This causes a lower frequency shift when a higher order resonator stack is used. As observed, the earth's gravitational pull of the suspended ribbon has a higher effect on long ribbons, which are necessary for some frequency ranges. Therefore, it is advantageous to construct and configure the MMR marker as described herein to obtain a consistent performance in all orientations.

In one aspect of the invention, MMR marker 100 can further include additional displacement restraints 170a and 170b respectively disposed between the central region 153 and respective ends 151 and 152 of the element stack 150. In one aspect, the additional displacement restraints 170a, 170b can be positioned along the resonator stack 150 at approximately ⅓ the distance between the central region 153 and each respective end 151, 152. Alternatively, in another aspect, the additional displacement restraints 170a, 170b can be placed closer to the resonator stack ends 151, 152. Each of the displacement restraints 170a, 170b limits an amount of the flaring movement of the resonator stack. As such, the displacement restraints 170a, 170b can be sized to allow for some separation between the elements, meaning that the ribbons/strips 150a-150d may not be in contact with one another. The additional displacement restraints help reduce the bending of ribbons/strips of longer lengths (and high order stacks) due to gravity pull. The displacement restraints 170a, 170b can be formed from a rigid plastic material and operate to reduce signal frequency changes when the orientation of the MMR (with respect to the ground surface) is changed.

In an alternative aspect of the invention the resonator stack 150 may include resonator strips having a curl along the long axis (a processing effect due to quenching on a cold wheel), where a first set of resonator strips are oriented "curl up" and a second set of resonator are oriented "curl down." The resonator strips can be stacked such that half of the ribbons are curled down and half of the ribbons are curled up, with the adjacent curls being away from each other, in an alternating manner. This arrangement can provide further frequency stability in any orientation, where the resonator stack will have overall symmetry in the up and down rotations. With this orientation, the ribbons closest to the top and bottom covers can be used to limit the overall stack ribbon movement due to gravity (some slight touching may occur).

In another aspect, MMR marker 100 can further include a substrate 115 to support the other components of the MMR marker, such as the end bias magnets 140a, 140b and central clamping element 160. The substrate 115 can thus maintain the distance of the bias magnets 140a, 140b from the stacked element ends 151, 152. The substrate 115 can be formed from a flexible plastic material, such that the MMR marker can be bent (such as when affixed to a flexible pipe).

FIG. 1C shows another aspect of the present invention, an MMR marker 100'. MMR marker 100' includes a plurality of ferromagnetic elements 150, in this embodiment, the ferromagnetic elements comprise six resonator strips 150a-150f disposed in a stacked arrangement, each ferromagnetic element having a first lengthwise end 151 and a second lengthwise end 152. Other components of MMR marker 100' can be the same as those described with respect to FIG. 1A.

Figure 1D:
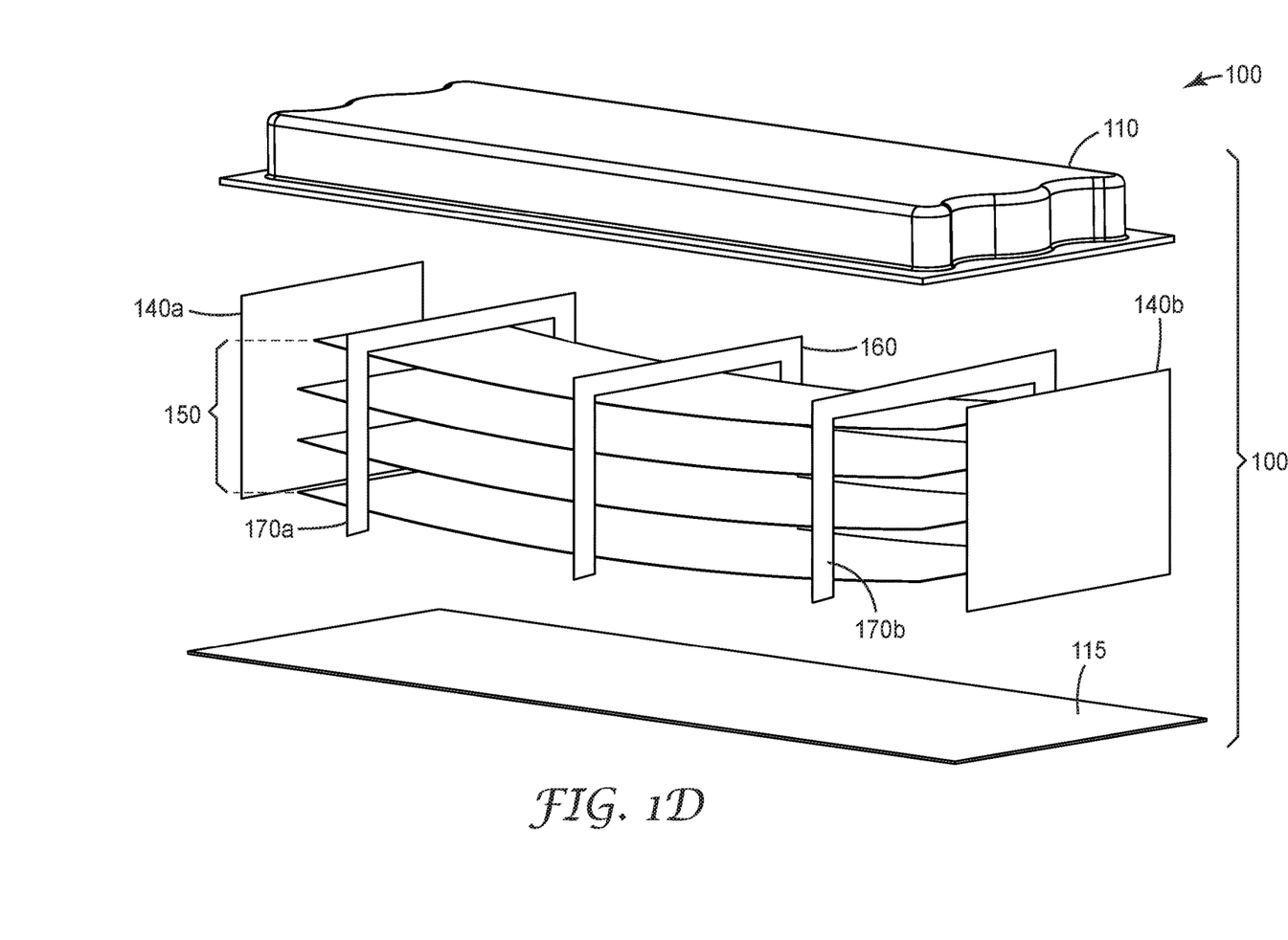
FIG. 1D is an exploded view of a magneto mechanical resonator device according to another aspect of the invention.

As shown in the exploded view of FIG. 1D, MMR marker 100 (or MMR marker 100') can further include a housing or cover 110. Housing or cover 110 is configured to enclose the aforementioned MMR components. The housing 110 and substrate 115 can be formed from a plastic or any other non-conductive material, such as PVC, or other polymers. In one aspect, the housing can be formed using a conventional vacuum forming process. In a preferred aspect, the housing material can maintain its shape and spacing around the resonator strip and bias material. In addition, the housing and component material can be formed as a non-rigid or flexible structure (e.g., it can be corrugated), either as a result of material composition or thickness of the housing walls. Also, the housing can have a low profile. For example, a corrugated housing can provide higher strength than a flat housing and can flex, making the product suitable for direct bury applications and on plastic pipe applications.

In an alternative aspect of the invention, the MMR marker 100, 100' can be placed within a protective capsule or outer housing designed to withstand rugged conditions. The protective capsule can be formed from a rugged material such as high density polyethylene (HDPE).

MMR marker 100, 100' can be disposed on or near an underground asset, such as a pipe, conduit, or other facility. For example, an MMR marker 100, 100' can be a stand-alone marker, it can be physically attached to an underground asset, such as a pipe or other utility, or it can be attached to another device, such as caution or warning tape, located at or near the underground asset. In addition, the MMR markers described herein can be utilized in non-underground environments, such as for use in locating and identifying above-ground assets otherwise hidden from view (such as in a container or within a building wall, ceiling, or floor).

Moreover, the MMR markers can be specifically designed to operate at different frequencies which are associated with unique asset types such as different utility infrastructure (e.g., water, waste water, electric, telephone/cable/data, and gas). For example, in one aspect, the MMR marker has a frequency range of from about 34 kHz to about 80 kHz. It is noted that for some applications, for example, for plastic pipe locating, frequency shifts are not desirable where multiple MMR markers may be combined to achieve additional detection depth. Accordingly, the MMR markers disclosed herein can be clustered (for additional depth), where the markers will substantially add in a coherent manner due to the frequency stability, without demonstrating substantial frequency mismatch and shift. In addition, especially for pipe locating applications, the MMR markers can be employed to provide not only asset location, but also asset directionality.

Figure 2A:
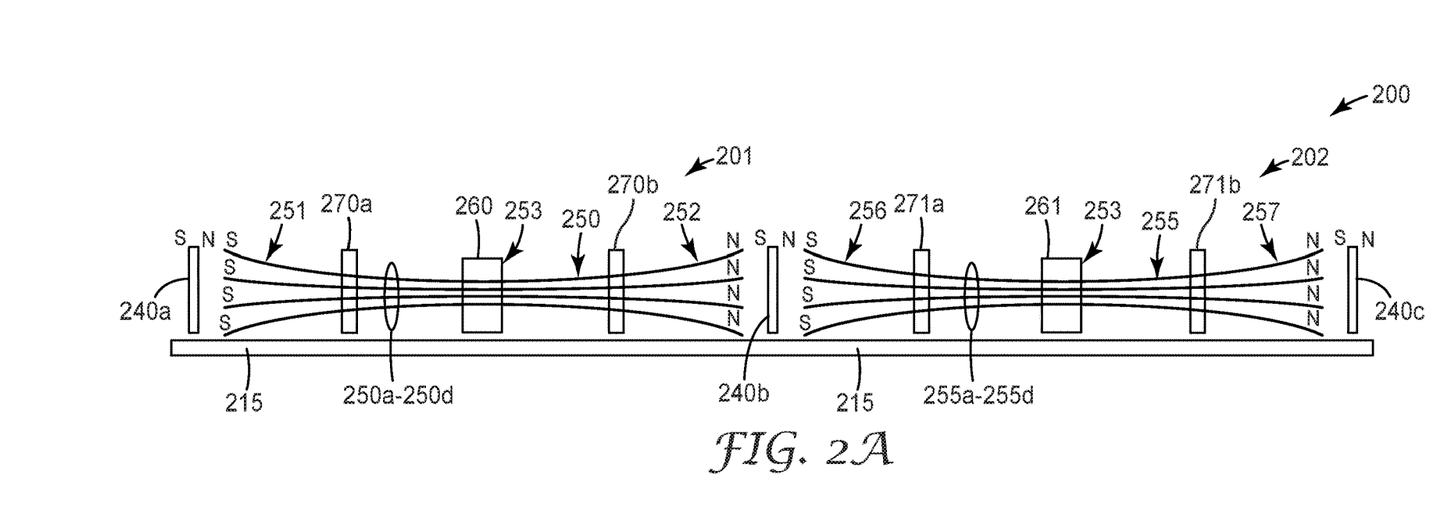
FIG. 2A is a partial side view of a cluster magneto mechanical resonator device according to another aspect of the invention.

In another aspect of the invention, FIG. 2A shows MMR marker 200, which is formed as a cluster of MMR markers 201 and 202. In this cluster construction, MMR markers 201, 202 share an end bias magnetic element 240b. Optionally, the MMR markers 201, 202 can also share a common substrate 215. As would be apparent to one of ordinary skill in the art given the present description, an alternative cluster construction having three, four, five or more markers, each sharing at least one end bias magnet with another MMR marker, can also be utilized. This cluster construction can provide a higher signal (approximately proportional to the number of markers in a cluster) while sharing end magnets.

In particular, first MMR marker 201 includes a plurality of ferromagnetic elements 250. In this aspect, the ferromagnetic elements comprise four resonator strips 250a-250d disposed in a stacked arrangement, each ferromagnetic element having a first lengthwise end 251 and a second lengthwise end 252. While four resonator strips are shown as comprising ferromagnetic element stack 250, the plurality of ferromagnetic elements may comprise a stack of 2, 3, 4, 5, 6, 7, 8, or more resonator strips, depending on the conditions. The resonator strips 250a-250d can be stacked directly on top of each other, or alternatively, one or more spacers, such as glue dots (not shown) can be disposed between resonator strip at the central lengthwise region 253 of the stack 250 such that the strips are not directly in contact with one another at region 253.

Similarly, second MMR marker 202 includes a plurality of ferromagnetic elements 255. In this aspect, the ferromagnetic elements comprise four resonator strips 255a-255d disposed in a stacked arrangement, each ferromagnetic element having a first lengthwise end 256 and a second lengthwise end 257. While four resonator strips are shown as comprising ferromagnetic element stack 255, the plurality of ferromagnetic elements may comprise a stack of 2, 3, 4, 5, 6, 7, 8, or more resonator strips, depending on the conditions. The resonator strips 255a-255d can be stacked directly on top of each other, or alternatively, one or more spacers, such as glue dots (not shown) can be disposed between resonator strip at the central lengthwise region 258 of the stack 255 such that the strips are not directly in contact with one another at region 258.

Resonator strips 250a-250d and 255a-255d can each comprise a ferromagnetic material with magnetostrictive properties, such as the materials described above.

MMR markers 201 and 202 each include bias magnetic elements disposed at each end of the resonator element stack. As shown in FIG. 2A, a first bias magnetic element, such as bias magnet 240a is disposed adjacent to end 251 of the first resonator element stack 250 and a second bias magnetic element, such as bias magnet 240b is disposed adjacent to end 252 of the resonator element stack 250. This magnetic bias orientation can help reduce the effects of gravity on the element stack (for example, if a bias magnet is placed above one or more ferromagnetic elements, gravity will act to pull the element(s) away from the bias magnet).

As mentioned above, in this cluster configuration, end bias magnet 240b is shared by both MMR marker 201 and MMR marker 202. Thus, bias magnet 240b is disposed adjacent to end 256 of the second resonator element stack 255 and another bias magnetic element, such as bias magnet 240c is disposed adjacent to end 257 of the resonator element stack 255.

Bias magnetic elements 240a, 240b, 240c can each comprise a permanent magnet or a magnetically hard or semi-hard metal strip, such as the materials described above. In another aspect, one or more of MMR markers 201 and 202 can include field concentrators disposed between the bias magnetic elements and each end of the resonator element stack. The field concentrators help collect and direct the magnetic field from the bias magnetic elements towards the ends of the resonator element stack.

Further, MMR markers 201 and 202 can each include a clamping element, such as clamping element 260 disposed in a central lengthwise region 253 of the resonator element stack 250 and clamping element 261 disposed in a central lengthwise region 258 of the resonator element stack 255. The clamping elements restrict the displacement of the ferromagnetic elements 250a-250d, 255a-255d with respect to each other. The clamping elements 260, 261 can comprise the same materials and structures described above with respect to clamping elements 160 and 161. In addition, one or both of the clamping elements 260, 261 can include a shock absorbing feature to help reduce resonator element stack movement when the MMR is subjected to large vibrations during transport or installation. In a further alternative, a combination of glue dots or mechanical clamp with a permanent magnet clamp set can provide short term robustness to shock, drop, etc. while having a permanent hold by the permanent magnets.

In this manner, when exposed to an external magnetic field at a particular frequency, the resonator strips couple to the external magnetic field and convert the magnetic energy into mechanical energy, in the form of magneto-mechanical oscillations of the resonator strips. As shown in FIG. 2, as the central portion of the stacked arrangements 250, 255 are restricted from displacement by clamping elements 260, 261 the first and second ends of each resonator element 250a-250d, 255a-255d experience a flaring movement. As shown in FIG. 2A, under the bias magnetic field, first ends of resonator stacks 250, 255 are flared away from one another at one end of the respective element stacks and the second ends are flared away from one another at the respective second ends of the element stacks.

MMR markers 201, 202 can each further include additional displacement restraints, such as described above with respect to FIG. 1A. For example, for MMR marker 201, additional displacement restraint 270a can be disposed between first end 251 and central region 253 and a second displacement restraint 270b can be disposed between second end 252 and central region 253 of the element stack 250. Similarly, a displacement restraint 271a can be disposed between first end 256 and central region 258 and a second displacement restraint 271b can be disposed between second end 257 and central region 258 of the element stack 255. Displacement restraint positioning along the resonator element stack can be similar to that described above with respect to MMR marker 100. The displacement restraints can be constructed in a manner similar to that described above.

As mentioned above, in one aspect, MMR markers 201, 202 can share a common substrate 215 to support the other components of the MMR markers. In an alternative aspect, each MMR marker 201, 202 can have a separate substrate. The substrate 215 can be formed from a flexible plastic material, such that the cluster MMR marker 200 can be bent (such as when affixed to a flexible pipe).

In addition, cluster MMR marker 200 can further include a housing or cover configured to enclose MMR markers 201, 202. The housing can be constructed in a manner similar to housing 110 described above. In an alternative aspect of the invention, cluster MMR marker 200 can be placed within a protective capsule or outer housing designed to withstand rugged conditions. The protective capsule can be formed from a rugged material such as high density polyethylene (HDPE).

Figure 2B:
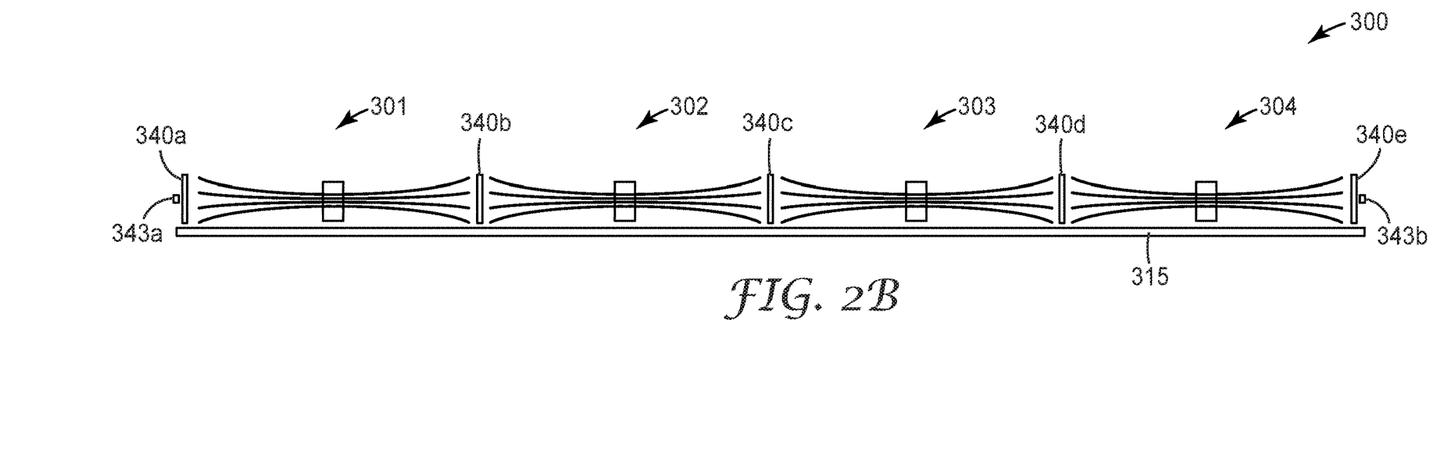
FIG. 2B is a partial side view of a cluster magneto mechanical resonator device according to yet another aspect of the invention.

In another aspect of the invention, FIG. 2B shows MMR marker 300, which is formed as a cluster of MMR markers 301, 302, 303, and 304. In this cluster construction, MMR markers 301, 302, 303, and 304 share at least one end bias magnetic element. Optionally, the MMR markers 301, 302, 303, and 304 can also share a common substrate 315. The substrate 315 can be formed from a flexible plastic material, such that the cluster MMR marker 200 can be bent (such as when affixed to a flexible pipe). As mentioned above, this type of cluster construction can provide a higher signal (approximately proportional to the number of markers in a cluster) while sharing end magnets.

In particular, MMR marker 301, 302, 303, and 304 each include a plurality of ferromagnetic elements, such as those described above. In this aspect, each stack of ferromagnetic elements comprises four resonator strips of ferromagnetic material with magnetostrictive properties, such as the materials described above. While four resonator strips are shown as comprising each ferromagnetic element stack, the plurality of ferromagnetic elements may comprise a stack of 2, 3, 4, 5, 6, 7, 8, or more resonator strips, depending on the conditions. As with the aspects of the invention described above, the resonator strips can be stacked directly on top of each other, or alternatively, one or more spacers, such as glue dots (not shown) can be disposed between resonator strip at the central lengthwise regions of each stack such that the strips are not directly in contact with one another at the central regions.

MMR markers 301, 302, 303, and 304 each include bias magnetic elements disposed at each end of the resonator element stack. As shown in FIG. 2B, bias magnetic elements 340a, 340b, 340c, 340d, and 340e are arranged at ribbon stack ends, in a similar manner as described above. In addition, MMR marker 300 further includes a first permeable bias material 343a disposed adjacent to bias magnet 340a and a second permeable bias material 343b disposed adjacent to bias magnet 340e. The permeable bias materials can comprise, for example, a ferrite material. The permeable bias material can be very small in size, for example, a cylindrical bead having a diameter of less than 0.2 inches and a length less than 0.2 inches.

With longer clusters, there may exist a slight frequency mismatch, even when all the individual ribbons and bias magnets are the same due to the varying reluctance path caused by the ribbon stacks themselves, whereby the middle ribbon stacks may experience a different effective bias than the ribbon stacks at the ends of the cluster. As observed, frequency mismatch among stacks in a cluster MMR can depend on factors such as the number of stacks, the nominal spacing between the bias magnets and the ribbon stacks, and the amorphous ribbon material behavior.

In this configuration, the additional permeable bias materials can be utilized to increase the magnetic field in the end stacks to match the overall bias experienced by the middle ribbon stacks (e.g., the ribbon stacks of MMR 302 and MMR 303). When the biases are all equally matched, all ribbon stacks of the cluster MMR will resonate at the same frequency, yielding even higher output.

In an alternative aspect, instead of adding permeable bias materials, the end bias magnets (e.g., bias magnets 340a and 340e of FIG. 2B) can be brought closer to the resonator stack ends to increase bias.

Bias magnetic elements 340a-340e can each comprise a permanent magnet or a magnetically hard or semi-hard metal strip, such as the materials described above. In another aspect, one or more of MMR markers 301-304 can include field concentrators disposed between the bias magnetic elements and each end of the resonator element stack. The field concentrators help collect and direct the magnetic field from the bias magnetic elements towards the ends of the resonator element stack.

Further, MMR markers 301-304 can each include a clamping element and/or displacement restraints, such as those described above.

As with the MMR devices described above, when exposed to an external magnetic field at a particular frequency, the resonator strips of MMR 300 couple to the external magnetic field and convert the magnetic energy into mechanical energy, in the form of magneto-mechanical oscillations of the resonator strips In addition, cluster MMR marker 300 can further include a housing or cover configured to enclose MMR markers 301-304. The housing can be constructed in a manner similar to the housings described above. In an alternative aspect of the invention, cluster MMR marker 300 can be placed within a protective capsule or outer housing designed to withstand rugged conditions. The protective capsule can be formed from a rugged material such as high density polyethylene (HDPE).

Cluster MMR markers 200, 300 can be disposed on or near an underground asset, such as a pipe, conduit, or other facility. For example, an MMR marker 200 can be a stand-alone marker, it can be physically attached to an underground asset, such as a pipe or other utility, or it can be attached to another device, such as caution or warning tape, located at or near the underground asset. In addition, the MMR markers described herein can be utilized in non-underground environments, such as for use in locating and identifying above-ground assets otherwise hidden from view (such as in a container or within a building wall, ceiling, or floor).

As described above, cluster MMR markers, such as cluster MMR markers 200 and 300 can be specifically designed to operate at different frequencies which are associated with unique asset types such as different utility infrastructure (e.g., water, waste water, electric, telephone/cable/data, and gas).

A portable locating device can be used to detect the MMR markers described herein. An exemplary portable locating device is described in US 2012/068823, incorporated by reference herein in its entirety. Such a locating device can comprise a single antenna that is used to generate an electromagnetic field and to detect a response of the MMR marker 100, 100', 200, 300. In an alternative aspect, the portable locating device can comprise multiple antennas, where one antenna could be used for generating an electromagnetic field and a second antenna could be used for detecting the response of the MMR marker to the generated field. The locating device can be battery powered for better portability. An integrated display can provide a user with a variety of information about located MMR markers and the assets that the MMR markers are associated with. For example, the display can provide information about marker and asset depth, direction, or other information about the MMR markers. Exemplary portable locating devices include the 3M™ Dynatel™ 1420 Locator and the 3M™ Dynatel™ 7420 Locator, both distributed by 3M Company of St. Paul, Minn. In one embodiment, the locating device firmware can be programmed so as to tune the locator antenna to radiate a particular, or several particular desired frequencies.

In alternative aspects, the MMR markers described herein can be utilized as part of a sterilization indicator system that provides time, temperature, and/or chemical information. In a further alternative aspect, the MMR markers described herein can be utilized as part of a perishable (e.g., food spoilage) indicator system that provides time and temperature information. In a further alternative aspect, the MMR markers described herein can be utilized as part of a leak detection system that provides leak information for above or below ground utilities. Alternatively, the MMR markers described herein can be designed to be physically affected by changing conditions so that a signal response may vary over time or conditions, indicating certain information to the user.

Experiments

Experiments were conducted comparing various characteristics of MMR markers designed in accordance with the configurations discussed above (e.g., where "cluster" MMR's discussed below have a design such as shown in FIG. 2), as well as comparing the above MMR configurations with MMRs having a conventional bottom bias magnet design, such as is described in US 2012/068823.

Unless otherwise indicated, the resonator materials were selected to operate at either around 35 kHz or 55 kHz and were supplied by Metglas, Inc. of Conway, S.C. Resonator strip dimensions are indicated with respect to each respective experiment.

In order to evaluate the frequency and gain stability of the example MMR markers with respect to earth's gravity and magnetic field, each marker or cluster of markers is placed inside a test fixture where the samples are oriented horizontally and rotated about their long axis to arrive at three key positions: up, down and sideways rotation, while an external magnetic field is swept to simulate the earth's magnetic field along the ribbon length to at least +/−0.6 Oe. The earth's magnetic field adds or subtracts from the bias field depending on orientation as well as location on the surface of the earth. The vector component of the earth's magnetic field along the ribbon length has the greatest effect on the total ribbon/strip bias, irrespective of the bias magnet location with respect to the ribbons/strips.

At each magnetic field step and rotational position, the MMR markers are excited with a burst of 220 cycles of the resonant frequency with a repetition rate of approximately 30 Hz (or 33 ms period). The excitation is generated by an external coil with a center 8" long ferrite antenna set to the side about 7" away from the MMR under test.

A receiver 8" long ferrite antenna is set to the other side of the MMR under test by about 7". A data acquisition system is used to sample the signal from the MMR during 40 cycles of the resonant frequency immediately after the transmit burst. The received signal is filtered and averaged to reduce noise influence then recorded in a relative scale, e.g., as dBs in these experiments. This scale is relevant for buried electronic marker detection since the signal varies with the inverse sixth power of distance (inverse cubic each way, round trip becomes to the inverse sixth power). A signal equivalent to approximately 0.1 mOe AC or less is used to simulate the excitation field from a locator at a distance of 3'-4'.

The MMR resonant frequency, resonance quality Q and gain are measured at different marker or cluster rotations: up, down and sideways, while an external field is swept to simulate the earth's magnetic field.

Experiment 1

Figure 3:
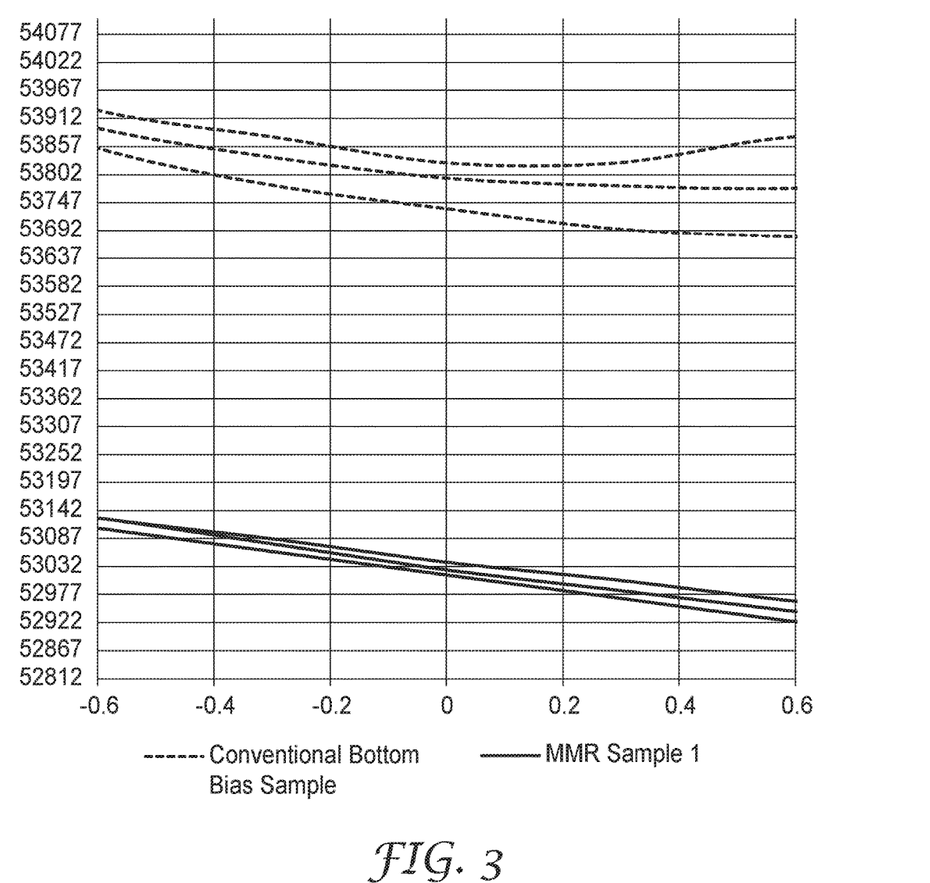
FIG. 3 is a graph showing a comparison between an experimental MMR cluster device and a cluster of two conventional (bottom bias) MMR devices (with respect to resonant frequency (Hz) vs. magnetic field offset (Oe)).

FIG. 3 shows a comparison (resonant frequency (Hz) vs. magnetic field offset (Oe)) of an experimental MMR cluster (MMR Sample 1) with a cluster of two conventional (bottom bias) MMRs. MMR Sample 1 comprises a 2 resonator stack configuration similar to that of MMR 200 described above, except with each resonator stack having 6 resonator strips, each having the dimensions 40 mm (L)×12 mm (W) (Metglas MG2826MB3 ribbons). The end bias magnets were KJ Magnetics Nd super magnets in block shape (T $\frac{1}{16}$", H $\frac{1}{8}$", W $\frac{1}{4}$"), with one shared bias magnet. The central clamping element was formed using tiny cylinder magnets (D $\frac{1}{16}$"×H $\frac{1}{16}$") for the center clamps. The conventional cluster MMR was designed similar to the MMRs described in US 2012/068823. The up, down and sideways orientations were measured for each cluster configuration. The MMRs are tuned at a frequency in the 55 kHz range.

The samples were tested as described above (rotated up, down and sideways while a bias field was applied to simulate the earth's magnetic field, and excited and measured by a transmit and a receive antenna each separated far enough as not to affect the measurement accuracy).

FIG. 3 shows that MMR Sample 1 has a significantly higher frequency stability and predictability as compared to the conventional MMR cluster product when subjected to rotation under various earth magnetic fields. At any given magnitude of the earth's magnetic field, if the sample is rotated, the conventional MMR cluster exhibits as much as a 4× shift of the resonant frequency due to sample rotation, as compared to MMR Sample 1.

Note that for the conventional bottom bias sample, since there are two MMRs in a cluster, the frequency plot corresponds to the highest frequency component in the sweep of the signal from both MMRs.

Also, since the frequency changes with the earth's magnetic field, in a more predictable manner, this example configuration allows an MMR such as MMR Sample 1 to be used as a magnetic field measuring device, and thus a higher sensitivity and more accurate sensor. If the resonant frequency shifts in a predictable manner due to the influence of the earth's magnetic field, the resonators can be used as a compass, where the resonant frequency would be a function of the ambient magnetic field. This allows an indirect measurement of the ambient magnetic field along the sensor's long axis. If combining two of more similar sensors, placed orthogonally to each other, this configuration can be used to measure the earth's magnetic field vector accurately and can be used as a compass. In contrast, conventional (bottom biased) MMR sensors can experience greater unpredictability in frequency shift and gain variance with respect to gravity.

Experiment #2

Figure 4:
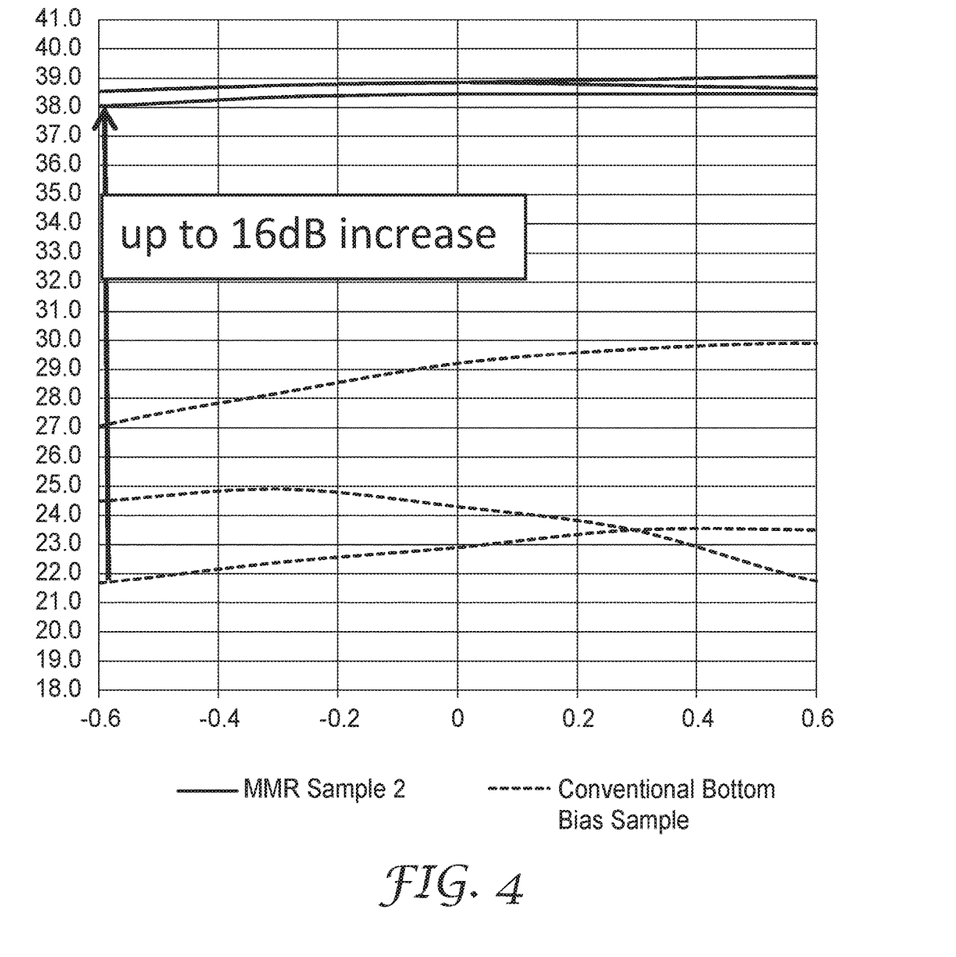
FIG. 4 is a graph showing a comparison between an experimental MMR cluster device and a cluster of two conventional (bottom bias) MMR devices (with respect to signal gain (dB) vs. magnetic field offset (Oe)).

FIG. 4 shows another comparison (signal gain (dB) vs. magnetic field offset (Oe)) of an experimental MMR cluster (MMR Sample 2) with a cluster of two conventional (bottom bias) MMRs. MMR Sample 2 comprises the same configuration as MMR Sample 1—a 2 resonator stack configuration similar to that of MMR 200 described above, except with each resonator stack having 6 resonator strips, each having the dimensions 40 mm (L)×12 mm (W) (Metglas MG2826MB3 ribbons). The end bias magnets were KJ Magnetics Nd super magnets in block shape (T $\frac{1}{16}$", H $\frac{1}{8}$", W $\frac{1}{4}$"), with one shared bias magnet. The central clamping element was formed using tiny cylinder magnets (D $\frac{1}{16}$"×H $\frac{1}{16}$") for the center clamps. The conventional cluster MMR was designed similar to the MMRs described in with respect to Experiment 1. The up, down and sideways orientations were measured for each cluster configuration. The MMRs are tuned at a frequency in the 55 kHz range.

The samples were tested as described above (rotated up, down and sideways while a bias field was applied to simulate the earth's magnetic field, and excited and measured by a transmit and a receive antenna each separated far enough as not to affect the measurement accuracy).

FIG. 4 shows that MMR Sample 2 has significantly higher net cluster gain and predictability as compared to the conventional MMR cluster product when subjected to rotation under various earth magnetic fields. Since there are two MMR markers in the cluster, the signal gain plot corresponds to the combined signal from both MMR markers. The gain of MMR Sample 2 is much higher than the comparative conventional sample, up to +16 dB in received signal, which corresponds to approximately 25× increase in stored power. MMR Sample 2 is also more stable with only about 1 dB change under this experiment. Based on these results, it is estimated that a marker having the design of MMR Sample 2 can be detected at a buried depth of at about 48" or more, which represents a 12" depth improvement over a marker having a conventional bottom bias design.

Experiment 3

Figure 5A:
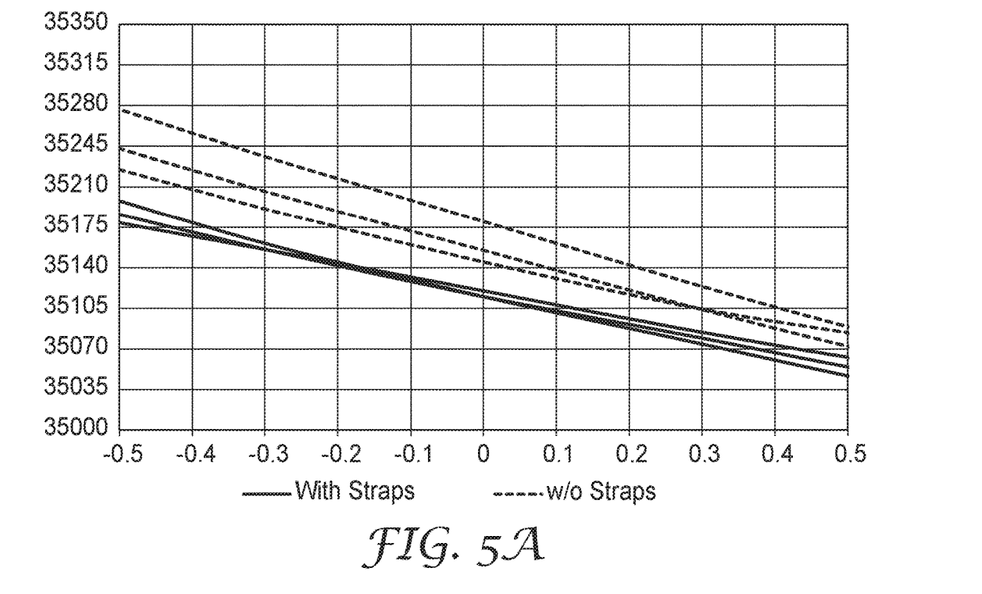
FIGS. 5A and 5B are graphs respectively showing resonant frequency (Hz) and signal gain (dB) vs. magnetic field offset (Oe) for an experimental MMR cluster device.
Figure 5B:
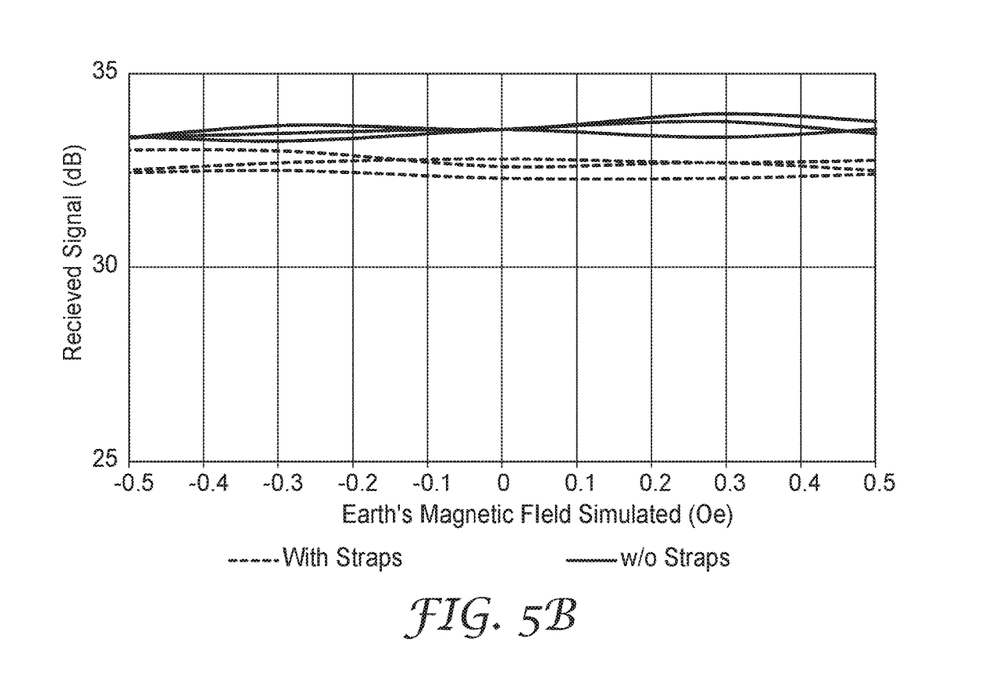

FIGS. 5A and 5B respectively show resonant frequency (Hz) and signal gain (dB) vs. magnetic field offset (Oe) for an experimental MMR cluster (MMR Sample 3). In particular, FIGS. 5A and 5B show the beneficial effects of utilizing additional displacement restraints in the MMR design, which help reduce the gravity effects further for longer ribbons (note that ribbon length is inversely proportional to the resonant frequency of the MMR marker). In this Experiment, MMR Sample 3 comprises a 2 resonator stack configuration similar to that of MMR 200 described above, except with each resonator stack having 6 resonator strips, each having the dimensions 60 mm (L)×12 mm (W) (Metglas MG2826MB3 ribbons). The end bias magnets were KJ Magnetics super magnets in block shape (T $\frac{1}{16}$", H $\frac{1}{8}$", W $\frac{1}{4}$"), with one shared bias magnet. The central clamping element was formed using very small KJ Magnetics Nd cylinder magnets magnetized axially (D $\frac{1}{16}$"×H $\frac{1}{16}$") for the center clamps. The additional displacement restraints comprised straps that restricted movement of the outer ribbons in the resonator stacks when the sample was rotated around the long axis.

FIG. 5A shows reduced overall frequency shift, especially at a given bias point, for a design with additional displacement restraints as opposed to a design using the same resonator strips, but without additional displacement restraints. It is also noted that for 60 mm long resonator strips, placement of the additional displacement restraints close to about $\frac{1}{3}^{rd}$ the distance between the center clamping element and the end of the ribbon stack provides suitable results. FIG. 5B shows that the gain stability is not impacted significantly when using additional displacement restraints.

Experiment 4

Figure 6A:
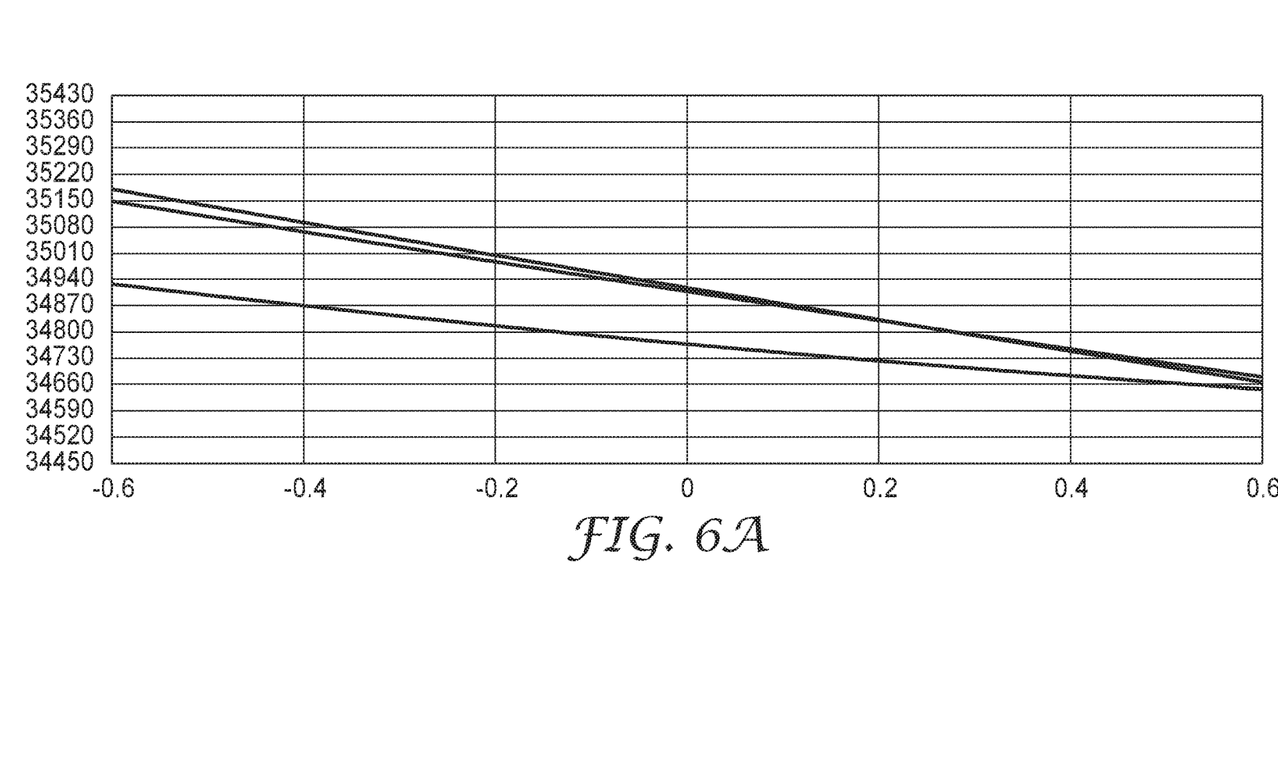
FIGS. 6A and 6B show a comparison between an experimental MMR cluster device and a cluster of two MMRs having a bottom bias design (in terms of resonant frequency (Hz) vs. magnetic field offset (Oe) for 60 mm resonator strip lengths).
Figure 6B:
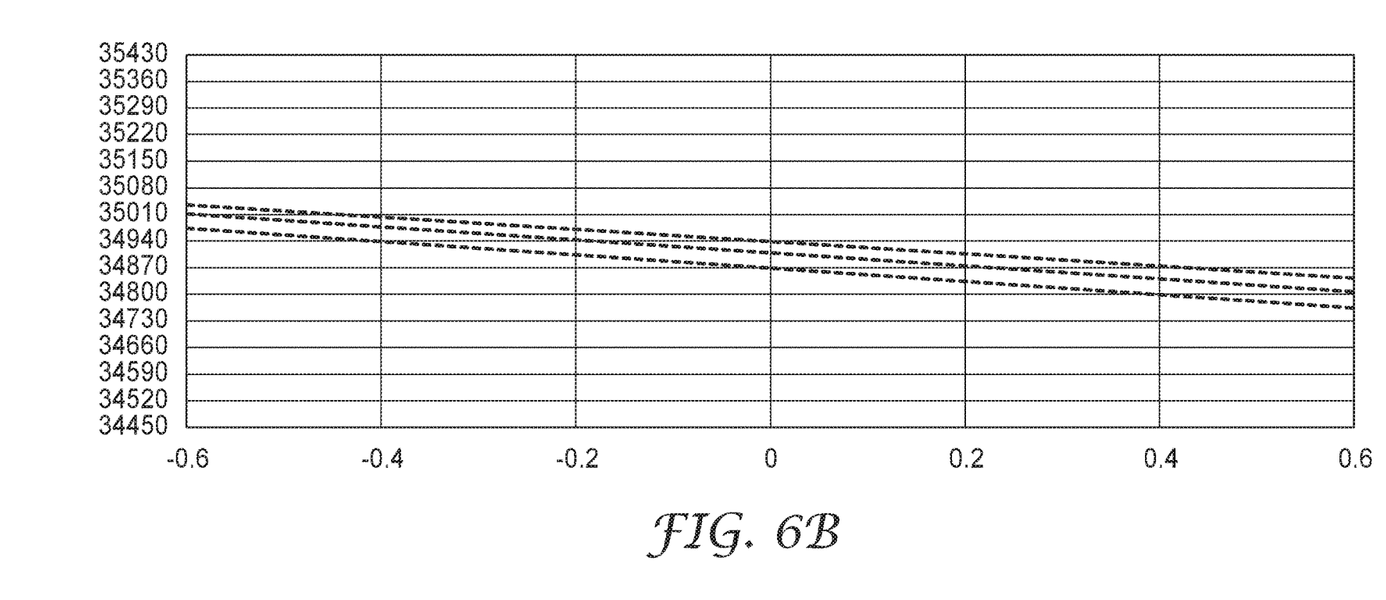

FIGS. 6A and 6B show a comparison (resonant frequency (Hz) vs. magnetic field offset (Oe)) of an experimental MMR single tag (MMR Sample 4—FIG. 6B) with an MMR having a conventional bottom bias design (FIG. 6A) for 60 mm resonator strip lengths. MMR Sample 4 comprises a resonator stack configuration similar to that of MMR 100 described above, except with the resonator stack having 8 resonator strips, having the dimensions 60 mm (L)×12 mm (W) (Metglas MG2826MB3 ribbons). The end bias magnets were KJ Magnetics Nd super magnets in block shape (T 1/16", H 1/8", W 1/4"). The central clamping element was formed using very small KJ Magnetics Nd cylinder magnets magnetized axially (D 1/16"×H 1/16") for the center clamps. The conventional bottom biased MMR utilized a resonator stack of 2 resonator strips (60 mm (L)×12 mm (W)) and a flat Arnokrome™ III material as a bias magnet. The strips were placed 1.74 mm from the bias magnet using a spacer. The up, down and sideways orientations were measured for each configuration. The MMRs are tuned at a frequency in the 35 kHz range. The spacer was increased in order to maximize the single tag received signal in the tester even when this additional thickness is not favorable from a tag profile perspective. The bias magnet, spacer, two ribbons and a cover make up the stack for the conventional MMR construction.

FIG. 6B shows less frequency variance for MMR Sample 4 than for the comparative sample in FIG. 6A at any given earth's magnetic field. The small frequency shift from MMR Sample 4 rotation is close to uniform across the whole earth's magnetic field range.

The detection distance from a detector to the MMR marker is increased for higher signal-to-noise ratios. A higher frequency stability for the end biased MMR configurations described herein yields a narrower system bandwidth that increases the signal-to-noise ratio, producing a higher system gain and deeper detection depths.

Experiment 5

Figure 7A:
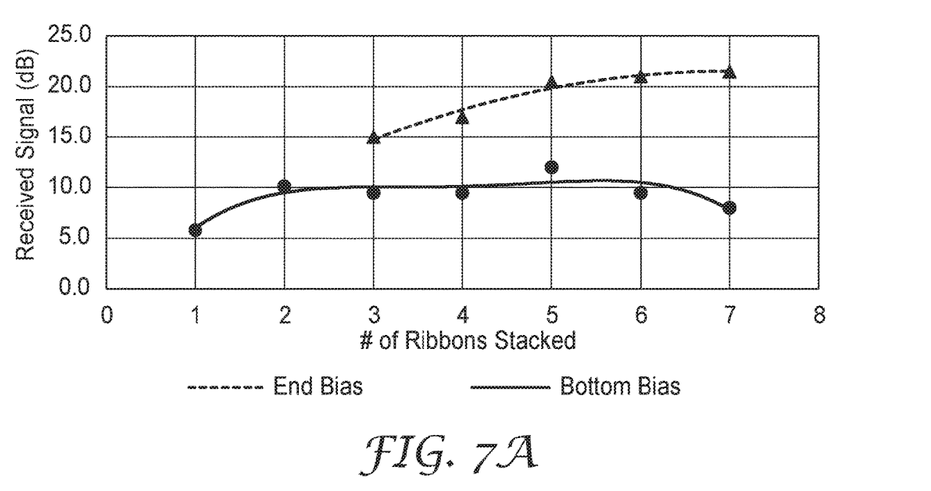
FIG. 7A is a graph of received signal gain and FIG. 7B is a graph of magneto-mechanical resonance quality (resonance Q) as a function of the number of resonator strips used for each MMR marker.
Figure 7B:
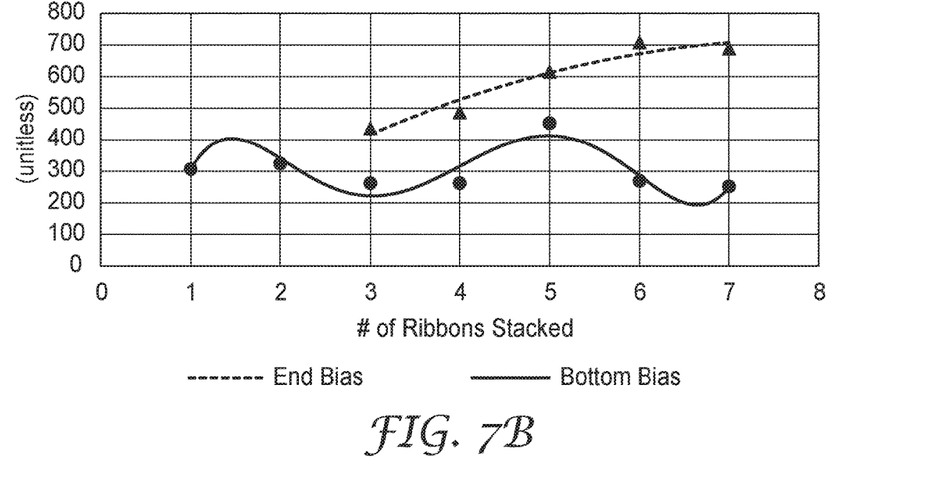

FIG. 7A is a graph of received signal gain and FIG. 7B is a graph of magneto-mechanical resonance quality (resonance Q) as a function of the number of resonator strips used for each resonator. The dashed line represents resonators having an end bias magnet/center clamp configuration, such as is described above. The solid line represents resonators having a conventional bottom bias magnet configuration. In this experiment, the same ribbons were used in both designs, where the curvature of the ribbons was not taken into consideration. In this experiment, the ribbons were stacked with curvature direction curled up or down being the same.

FIG. 7A shows that 3 or more resonator strips in a conventional bottom bias design does not yield increased signal per additional resonator strip. In contrast, the marker using the end bias configuration exhibits higher received signal as a function of additional resonator strips.

FIG. 7B shows that the magneto-mechanical resonance quality is increased for a marker having an end bias/center clamp configuration. This data indicates higher losses in a conventional bottom bias magnet design.

Thus, the MMR markers described herein can be utilized in many different identification and location applications. For example, an MMR marker can be a stand-alone marker, it can be physically attached to an underground asset, such as a pipe or other utility, or it can be attached to another device, such as caution or warning tape, located at or near the underground asset. In addition, the MMR markers described herein can be utilized in non-underground environments, such as for use in locating and identifying above-ground assets otherwise hidden from view (such as in a container or within a building wall, ceiling, or floor).

The present invention has now been described with reference to several individual embodiments. The foregoing detailed description has been given for clarity of understanding only. No unnecessary limitations are to be understood or taken from it. It will be apparent to those persons skilled in the art that many changes can be made in the embodiments described without departing from the scope of the invention.

Thus, the scope of the present invention should not be limited to the details and structures described herein, but rather by the structures described by the language of the claims, and the equivalents of those structures.

The invention claimed is:

1. A magneto mechanical resonator device, comprising:
a plurality of ferromagnetic elements disposed in a stacked arrangement, each ferromagnetic element having a first lengthwise end and a second lengthwise end;
a first bias magnetic element disposed adjacent to the first lengthwise end of the stacked arrangement;
a second bias magnetic element disposed adjacent to the second lengthwise ends of the stacked arrangement; and
a clamping element disposed in a central lengthwise region of the stacked arrangement to restrict displacement of the plurality of ferromagnetic elements with respect to each other at the central lengthwise region, wherein the first and second ends experience flaring movement.

2. The magneto mechanical resonator device of claim 1, wherein the clamping element suspends each ferromagnetic element from each other at the central lengthwise region.

3. The magneto mechanical resonator device of claim 1, further comprising a housing to enclose the resonator device.

4. The magneto mechanical resonator device of claim 3, wherein the housing has sufficient flexibility to be mounted to a coiled pipe.

5. The magneto mechanical resonator device of claim 1, wherein the clamping element comprises a pin extending through each of the plurality of ferromagnetic elements.

6. The magneto mechanical resonator device of claim 1, wherein the clamping element comprises a magnetic clamping element.

7. The magneto mechanical resonator device of claim 1, further comprising first and second displacement restraints respectively disposed between the central region and the first and second ends of the stacked arrangement, each of the first and second displacement restraints limiting an amount of flaring movement.

8. The magneto mechanical resonator device of claim 1, further comprising a first field concentrator disposed between the first end and the first bias magnetic element and a second field concentrator disposed between the second end and the second bias magnetic element.

9. The magneto mechanical resonator device of claim 1, wherein each of the ferromagnetic elements comprises a ferromagnetic metal strip having a length of about 25 mm to about 40 mm.

10. The magneto mechanical resonator device of claim 1, wherein each of the ferromagnetic elements comprises a ferromagnetic metal strip having a length of about 40 mm to about 65 mm.

11. The magneto mechanical resonator device of claim 1, further comprising a substrate to support the stacked arrangement.

12. The magneto mechanical resonator device of claim 11, further comprising a housing to enclose the stacked arrangement.

13. The magneto mechanical resonator device of claim 1, wherein each of the ferromagnetic elements comprises an amorphous metal.

14. The magneto mechanical resonator device of claim 3, wherein the housing is formed from a non-rigid material.

15. The magneto mechanical resonator device of claim 1, wherein the resonator device has a frequency range of from about 34 kHz to about 80 kHz.

16. The magneto mechanical resonator device of claim 1, wherein the resonator device can be detected at a depth up to about 48 inches underground.

17. A magneto mechanical marker system comprising the magneto mechanical resonator device of claim 1 and a portable locating device.

18. A cluster magneto mechanical resonator device, comprising:
- a first plurality of ferromagnetic elements disposed in a first stacked arrangement, each ferromagnetic element having a first lengthwise end and a second lengthwise end;
- a second plurality of ferromagnetic elements disposed in a second stacked arrangement, each ferromagnetic element having a first lengthwise end and a second lengthwise end;
- a first bias magnetic element disposed adjacent to the first lengthwise end of the first stacked arrangement;
- a second bias magnetic element disposed adjacent to the second lengthwise end of the first stacked arrangement, wherein the second bias magnetic element is also disposed adjacent to the first end of the second stacked arrangement and
- a third bias magnetic element disposed adjacent to the second lengthwise end of the second stacked arrangement, further comprising a first clamping element disposed in a first central lengthwise region of the first stacked arrangement to restrict the vertical displacement of the first plurality of ferromagnetic elements with respect to each other at the first central lengthwise region, and a second clamping element disposed in a second central lengthwise region of the second stacked arrangement to restrict the vertical displacement of the second plurality of ferromagnetic elements with respect to each other at the second central lengthwise region.

19. The cluster magneto mechanical resonator device of claim 18, further comprising a third plurality of ferromagnetic elements disposed in a third stacked arrangement, each ferromagnetic element having a first lengthwise end and a second lengthwise end, wherein the third stacked arrangement shares one of the bias magnetic elements with one of the first and second stacked arrangements.

* * * * *